United States Patent
Ho et al.

(10) Patent No.: US 7,751,779 B2
(45) Date of Patent: Jul. 6, 2010

(54) SATELLITE COMMUNICATION SYSTEM

(75) Inventors: Hau H. Ho, Huntington Beach, CA (US); Ethan A. Stein, Sterling, VA (US); Michael Fashano, Murrieta, CA (US); Peter J. Hadinger, Oakton, VA (US); Gary Lehto, Palos Verdes Estates, CA (US)

(73) Assignee: Northrop Grumman Space & Mission Systems Corp., Los Angeles, CA (US)

( * ) Notice: Subject to any disclaimer, the term of this patent is extended or adjusted under 35 U.S.C. 154(b) by 771 days.

(21) Appl. No.: 11/642,713

(22) Filed: Dec. 21, 2006

(65) Prior Publication Data

US 2008/0153414 A1 Jun. 26, 2008

(51) Int. Cl.
*H04Q 7/20* (2006.01)

(52) U.S. Cl. .................. 455/12.1; 455/13.1; 455/13.3; 455/15; 455/19; 455/427; 342/354; 342/352; 342/357.16; 342/359; 342/360

(58) Field of Classification Search ............... 455/12.1, 455/13.1, 13.3, 15, 19, 24, 427, 429, 3.02, 455/403, 426.1, 426.2, 422.1, 3.03, 500, 455/517, 428; 342/352, 354, 357.16, 357.17, 342/359, 360
See application file for complete search history.

(56) References Cited

U.S. PATENT DOCUMENTS

| | | | |
|---|---|---|---|
| 6,192,217 B1 * | 2/2001 | Farrell | 455/13.1 |
| 6,657,978 B1 * | 12/2003 | Millman | 370/316 |
| 2001/0018327 A1 * | 8/2001 | Houston et al. | 455/13.2 |
| 2003/0048222 A1 * | 3/2003 | Schmid et al. | 342/359 |
| 2004/0145517 A1 * | 7/2004 | Kinal et al. | 342/357.02 |
| 2004/0157554 A1 * | 8/2004 | Wesel | 455/12.1 |
| 2005/0052333 A1 * | 3/2005 | Rao et al. | 343/840 |

OTHER PUBLICATIONS

Transformational Wideband Communication Capabilities for the Warfighter. Datasheet [online]. Boeing Corporation, 2006 [retrieved on Nov. 13, 2006]. Retrieved from the Internet:http://www.boeing.com/defense-space/space/bss/factsheets/702/wgs/wgs_factsheet.html.

* cited by examiner

*Primary Examiner*—Keith T Ferguson
(74) *Attorney, Agent, or Firm*—Posz Law Group, PLC

(57) ABSTRACT

A payload (108) to be mounted onto a satellite (102) can include a first steerable antenna (302) providing a downlink to and an uplink from a first user terminal; a second steerable antenna (304) providing a downlink to and an uplink from a second user terminal; a switching network (306) coupling the first steerable antenna to the second steerable antenna; and a payload control unit (120) controlling the switching network to select one of the downlink to the first user terminal provided by the first steerable antenna and the downlink to the second user terminal provided by the second steerable antenna, and one of the uplink from the first user terminal provided by the first steerable antenna and the uplink from the second user terminal provided by the second steerable antenna.

18 Claims, 9 Drawing Sheets

SATELLITE COMMUNICATION SYSTEM

TECHNICAL FIELD

The technical field relates generally to satellite communication systems and, more particularly, to a payload to be mounted onto a satellite in a satellite communication system to provide communication links for user terminals.

BACKGROUND

A satellite communication system includes one or more satellites serving as a relay station for two or more stations, or user terminals, on or near the earth. The satellite communication system can provide two-way communication or communication links among user terminals, with one central hub and many remote stations.

The bandwidth available for the transmission from a user terminal to a satellite, or an uplink, and from the satellite to the user terminal, or a downlink, will depend on the frequency band used by the satellite communication system. Higher frequency bands such as the Ku band of 14.0-14.5 GHz for uplink and 10.7-12.75 GHz for downlink, Ka-band of 27.5-31 GHz for uplink and 17.7-21.2 GHz for downlink, V-band of 47.2-50.2 GHz for uplink and 37.5-42 GHz for downlink provide a wide bandwidth of up to 4.5 GHz spectrum. Typically, a single satellite will handle a large bandwidth and divide it into a number of channels of smaller bandwidth.

A satellite communication system must be tailored to particular application demands. For example, military wideband communications require sufficient capacity for enabling execution of tactical command and control, intelligence, surveillance and reconnaissance, battle management and combat support information. Currently, military wideband communications are supported by: the Defense Satellite Communication System (DSCS) that operates in the X-band; the Global Broadcast Service (GBS) that operates in the Ka-band; and commercial satellites operating in the C and Ku-bands. A Wideband Gapfiller Satellite (WGS) will replace the DSCS and GBS in the future. The WGS operating in X-band and military Ka-band will have 19 independent beams that can be positioned throughout the field of view of each satellite.

In order to satisfy military demands for increasingly higher bandwidth to support high data rate users, satellites must be continuously placed in service to maintain the needed capacity. However, problems associated with the military procurement process such as, for example, long development times, funding and schedule slip result in delayed service starts.

Servicing of commercial satellites does not involve many of the problems discussed above. Therefore, commercial satellites can be used to augment present military capacity. However, typical commercial satellite communication systems are optimized to focus resources on large population centers. That is, the commercial satellite communication systems operate with fixed beams having limited coverage in the open ocean and sparsely populated areas of the earth and have limited channel bandwidth. Further, commercial satellite communication systems typically operate in the C and Ku band and have limitations in supporting Department of Defense (DoD) requirements where and when needed.

Military wideband communications, on the other hand, require flexible satellite communication systems in which capacity and connectivity can be redirected to areas anywhere within the satellite field-of-view where military related operations are needed.

BRIEF DESCRIPTION OF THE DRAWINGS

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the present invention.

SUMMARY

The present disclosure concerns a payload to be mounted on a host, such as, for example, a satellite. According to a first embodiment, the payload can include a first steerable spot beam antenna providing a downlink to and an uplink from a first user terminal; a second steerable spot beam antenna providing a downlink to and an uplink from a second user terminal; a switching network coupling the first steerable spot beam antenna to the second steerable spot beam antenna; and a payload control unit controlling the switching network to select one of the downlink to the first user terminal provided by the first steerable spot beam antenna and the downlink to the second user terminal provided by the first steerable spot beam antenna and one of the uplink to the first user terminal provided by the first steerable spot beam antenna and the uplink to the second user terminal provided by the second steerable spot beam antenna as a communication link.

According to a second embodiment, the payload can include a steerable spot beam antenna for providing a downlink to a first user terminal and a steerable multibeam antenna coupled to the steerable spot beam antenna for providing an uplink from a second user terminal, the steerable multibeam antenna including a beam forming network defining a plurality of reception beams and composite beams that include at least a subset of the reception beams.

According to a third embodiment, the payload can include a steerable spot beam antenna for providing a downlink to and an uplink from a first user terminal; and a steerable multibeam antenna for providing a downlink to and an uplink from a second user terminal, the steerable multibeam antenna including a beam forming network for defining a plurality of reception beams and reception composite beams, wherein the steerable multibeam antenna is coupled to the steerable spot beam antenna to link the downlink to the first user terminal provided by the steerable spot beam antenna with the uplink from the second user terminal provided by the steerable multibeam antenna.

DETAILED DESCRIPTION

Figure 1:
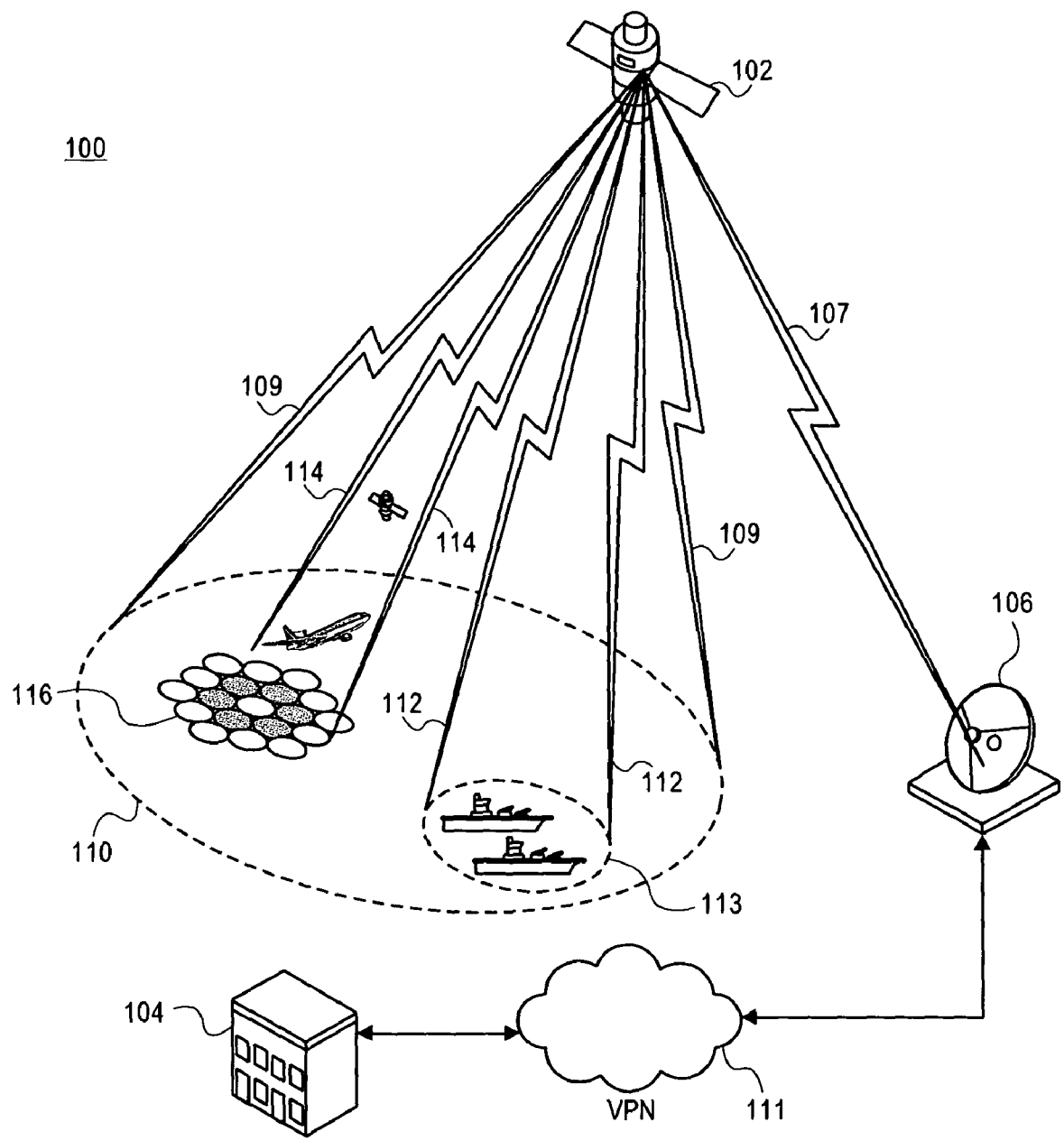
FIG. 1 is a schematic diagram illustrating exemplary operations of a satellite communication system according to various embodiments.

Referring to FIG. 1, an exemplary satellite communication system 100 will be discussed. The satellite communication system 100 can include a host spacecraft such as a satellite 102, a hub 104 and a satellite control center (SCC) 106. The satellite 102 can be, for example, a commercial satellite and the SCC 106 can be a commercial facility for controlling the satellite 102. Accordingly, the satellite 102 has a bidirectional communication link 107 with the SCC 106 for receiving control signals from the SCC 106 and sending satellite information thereto. A payload 108 (shown in FIG. 2) is mounted on the satellite 102. The hub 104 can control the payload 108 by sending data, such as control signals to, and receiving data, such as satellite data, from the SCC 106. The SCC 106 can pass data between the payload 108 and the hub 104 via the bidirectional communication link 107. Preferably, the data communication between the hub 104 and the SCC 106 is over a secure terrestrial network. For example, the hub 104 can send encrypted data to and receive encrypted data from the payload 108 via the SCC 106 over a virtual private network (VPN) 111.

The payload 108 mounted on the satellite 102 includes antenna devices such as an earth coverage antenna, steerable spot beam antenna devices and steerable multibeam antennas that can provide downlinks and uplinks with user terminals that are within a field of coverage 110 provided by an earth coverage beam 109 of the earth coverage antenna. The downlinks and uplinks can be provided by, for example, spot beams, multibeams or composite beams. A user terminal can refer to a single entity or multiple entities on or near the earth that include an antenna for receiving from and/or transmitting to an antenna on the payload 108.

As illustrated in the exemplary system 100 of FIG. 1, one or more steerable spot beam antenna devices on the payload 108 provide a spot beam in, for example, the Ku-band, Ka-band or V-band 112 defining a coverage area 113 for user terminals such as ships in the open ocean. One or more steerable multibeam antennas in, for example, Ku-band, Ka-band, or V-band on the payload 108 provide multibeams 114 defining a coverage area 116 for user terminals such as an unmanned aerial vehicle (UAV), a low earth orbiting satellite in a non-geostationary orbit (non-GSO) and/or troop formations in non-populated areas. A communication link can be established via the satellite communication system 100 between, for example, a first ship and a second ship in the coverage area 113 provided by the spot beam 112, between one of the ships in the coverage area 113 and the UAV, non-GSO satellite or the troop formation in coverage area 116, or between the troop formation and the UAV/non-GSO satellite in the coverage area 116.

Figure 2:
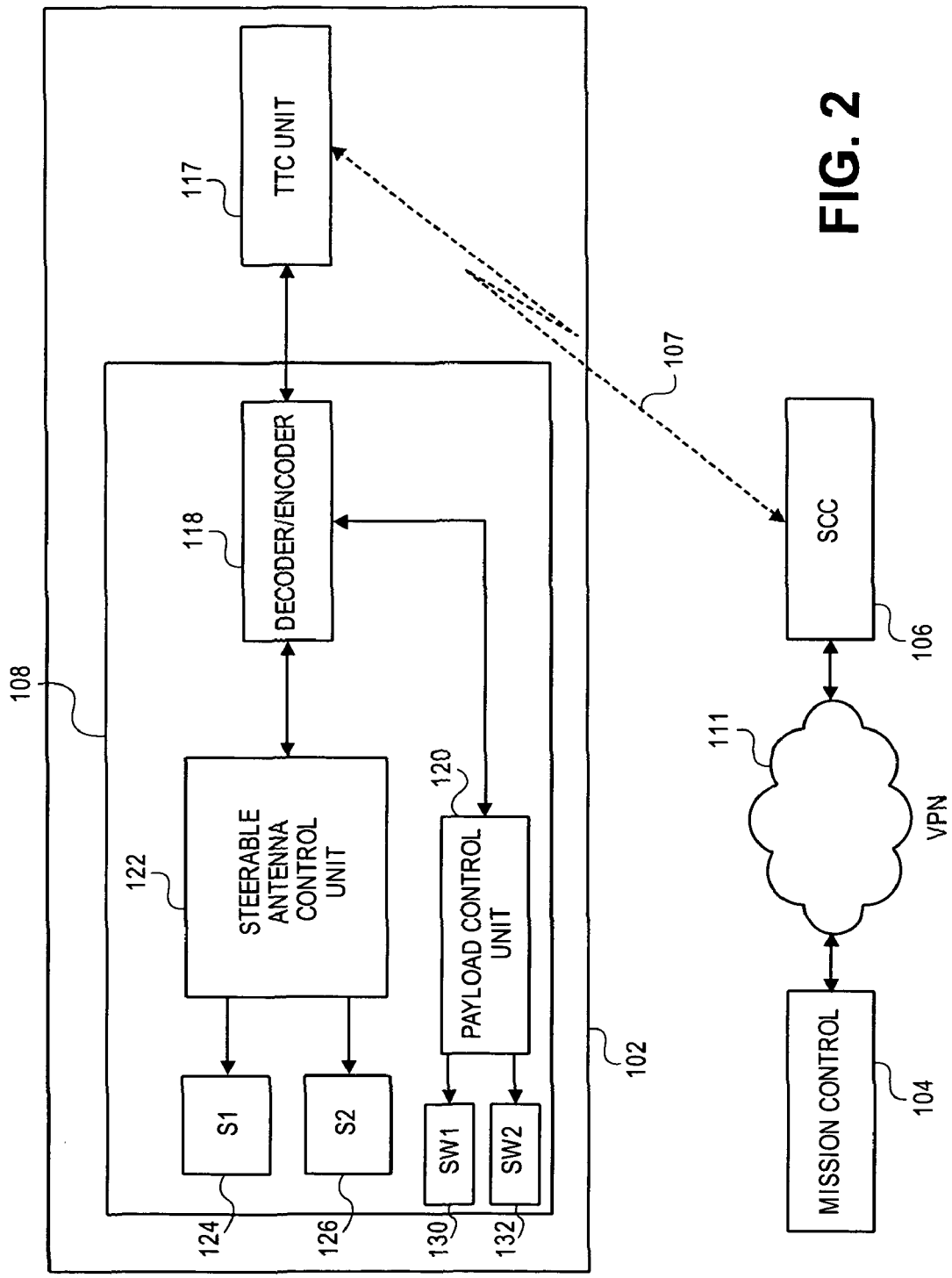
FIG. 2 is a schematic block diagram of the satellite communication system.

Referring to the block diagram of FIG. 2, the satellite 102 includes a communication subsystem such as a Telemetry Tracking and Control (TTC) unit 117 for interfacing between the SCC 106 and the satellite 102. The TTC unit 117 receives the control signals from the SCC 106 and transmits satellite telemetry information to the SCC 106. Further, the TTC unit 117 is coupled to the payload 108 for forwarding control signals from the hub 104 to the payload 108 as well as forwarding information from the payload 108 to the SCC 106.

The payload 108 includes a decoder/encoder 118, a payload control unit 120 and a steerable antenna control unit 122. The decoder/encoder 118, which may be configured as a Ku, Ka or V-band decoder/encoder, is coupled to the TTC unit 117 for decoding encrypted control signals received from the hub 104 and transmitting the decoded signals to the payload control unit 120 and the steerable antenna control unit 122 as well as encrypting feedback information to be transmitted to the hub 104. The steerable antenna control unit 122 is coupled to servomotors 124, 126 of the steerable antenna devices. The steerable antenna control unit 122 can independently steer each of the servomotors 124, 126 of the steerable antenna devices based upon the decoded signals received from the decoder/encoder 118 to independently reorient the steerable antenna devices. The payload control unit 120 can be coupled to switching elements 130, 132 at the steerable antenna devices to select a particular beam, frequency or channel based upon the decoded signals received from the decoder/encoder 118.

Therefore, because the payload 108 is connected to the satellite 102 by only the TTC unit 117, the payload 108 has a limited footprint on the satellite 102. However, the payload 108 may further be coupled to other subsystems of the satellite 102 to obtain basic resources such as, for example, power. The steerable antenna devices can be, for example, one or more steerable spot beam antennas and a steerable multibeam antenna.

Figure 3A:
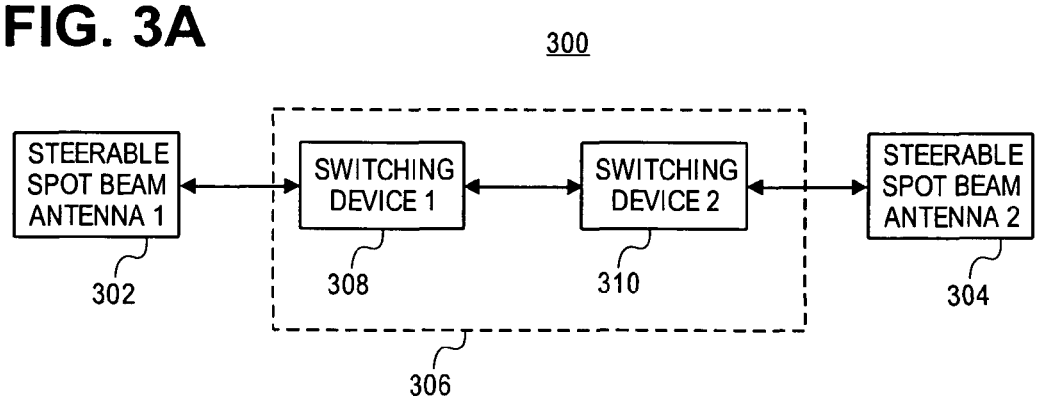
FIGS. 3A-3B are schematic block diagrams of a payload for the satellite communication system according to a first embodiment.
Figure 3B:
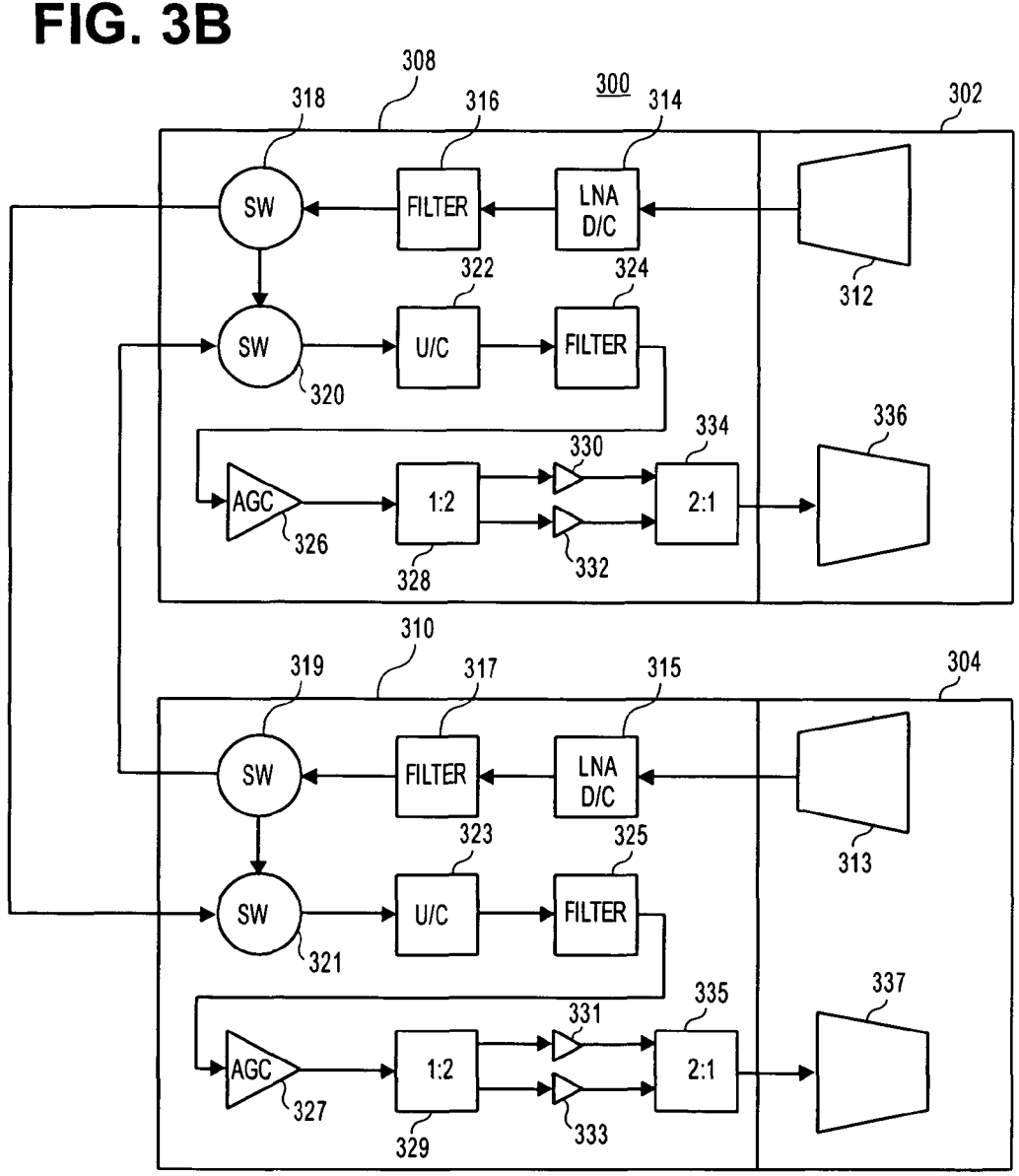

Referring to FIGS. 3A-3B, a first embodiment of a payload 300 to be mounted on the satellite 102 in the satellite communication system 100 will be discussed. The payload 300 includes a first steerable spot beam antenna 302 for providing a downlink to and an uplink from a first user terminal, a second steerable spot beam antenna 304 for providing a downlink to and an uplink from a second user terminal, and a switching network 306 coupling the first steerable spot beam antenna 302 and the second steerable spot beam antenna 304. The switching network 306 can include a first switching device 308 and a second switching device 310.

Referring to FIG. 3B, the first switching device 308 can include a low noise amplifier (LNA) and down converter (D/C) 314 coupled to an input horn 312 of the first steerable spot beam antenna 302, that is, the uplink from the first user terminal. The LNA/D/C 314 is connected to an input switching element 318 via a filter 316. The input switching element 318 is connected to an output switching element 321 of the second switching device 310 and an output switching element 320 of the first switching device 308. The output switching element 320 is connected to an up-converter (U/C) 322. The U/C 322 is connected to a filter 324, which is connected to an adjustable gain control (AGC) element 326. The AGC 326 is connected to a 1:2 switch 328, and the output thereof is connected to two high power amplifiers such as, for example, 100 W traveling wave tube amplifiers (TWTA) 330, 332. The two TWTAs 330, 332 are connected to a 2:1 switch 334. The output of the switch 334 is connected to the output horn 336 of the first steerable spot beam antenna 302, that is, the downlink to the first user terminal.

The second switching device 310 has a similar configuration to the first switching device 308. The second switching device 310 can include a LNA and D/C 315 coupled to an input horn 313 of the second steerable spot beam antenna 304, that is, the uplink from the second user terminal. The LNA/D/C 315 is connected to an input switching element 319 via a filter 317. The input switching element 319 is connected to the output switching element 320 of the first switching device 308 and the output switching element 321 of the second switching device 310. The output switching element 321 is connected to a U/C 323. The U/C 323 is connected to an AGC element 327 via a filter 325. The AGC 327 is connected to a 1:2 switch 329 and the output thereof is connected to two high power amplifiers such as 100 W TWTAs 331, 333. The two TWTAs 331, 333 are connected to a 2:1 switch 335. The output of the switch 335 is connected to an output horn 337 of the second steerable spot beam antenna 304, that is, the downlink to the second user terminal.

The payload control unit 120 can selectively control the input switching element 318 of the first switching device 308 and the input switching element 319 of the second switching device 310 to select one of the downlink to the first user terminal provided by the first steerable spot beam antenna 302, and the downlink to the second user terminal provided by the second steerable spot beam antenna 304 and one of the uplink from the first user terminal provided by the first steerable spot beam antenna 302 and the uplink from the second user terminal provided by the second steerable spot beam antenna 304. For example, if the payload control unit 120 connects the input switching element 318 to the output switching element 321, then the input horn 312 of the first steerable spot beam antenna 302 will be linked with the output horn 337 of the second steerable spot beam antenna 304. Thereby, an uplink provided by a spot beam of the first steerable spot beam antenna 302 will be linked with a downlink provided by a spot beam of the second steerable spot beam antenna 304. If the payload control unit 120 connects the input switching element 319 to the output switching element 320, then the input horn 313 of the second steerable spot beam antenna 304 will be linked with the output horn 336 of the first steerable spot beam antenna 302. Thereby, an uplink provided by a spot beam of the second steerable spot beam antenna 304 will be linked with a downlink provided by a spot beam of the first steerable spot beam antenna 302.

As discussed above with reference to FIG. 2, the payload control unit 120 controls the switching elements based upon signals received from the decoder/encoder 118. The steerable antenna control unit 122 can independently steer the first servomotor 124 of the first steerable spot beam antenna 302 and the second servomotor 126 of the steerable spot beam antenna 304 based upon signals received from the decoder/encoder 118.

The configuration of the payload 300 includes two steerable spot beam antennas. The weight and power of the payload 300 are an order of 100 kg and 500 W, respectively. The first and second steerable spot beam antennas 302, 304 can communicate over uplink (reception) frequency bands of 14.0-14.5 GHz, 27.5-30 GHz, 30-31 GHz and 47.2-50.2 GHz and downlink (transmission) frequency bands of 10.7-12.75 GHz, 17.7-20.2 GHz, 20.2-21.2 GHz and 37.5-42 GHz. That is, the first and second steerable spot beam antennas 302, 304 can provide an aggregate bandwidth of up to 2 GHz.

Figure 4A:
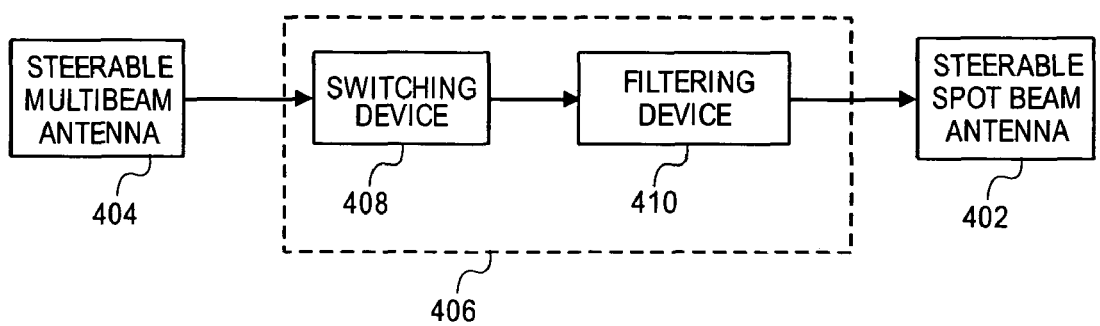
FIGS. 4A-4C are schematic block diagrams of a payload for the satellite communication system according to a second embodiment.
Figure 4B:
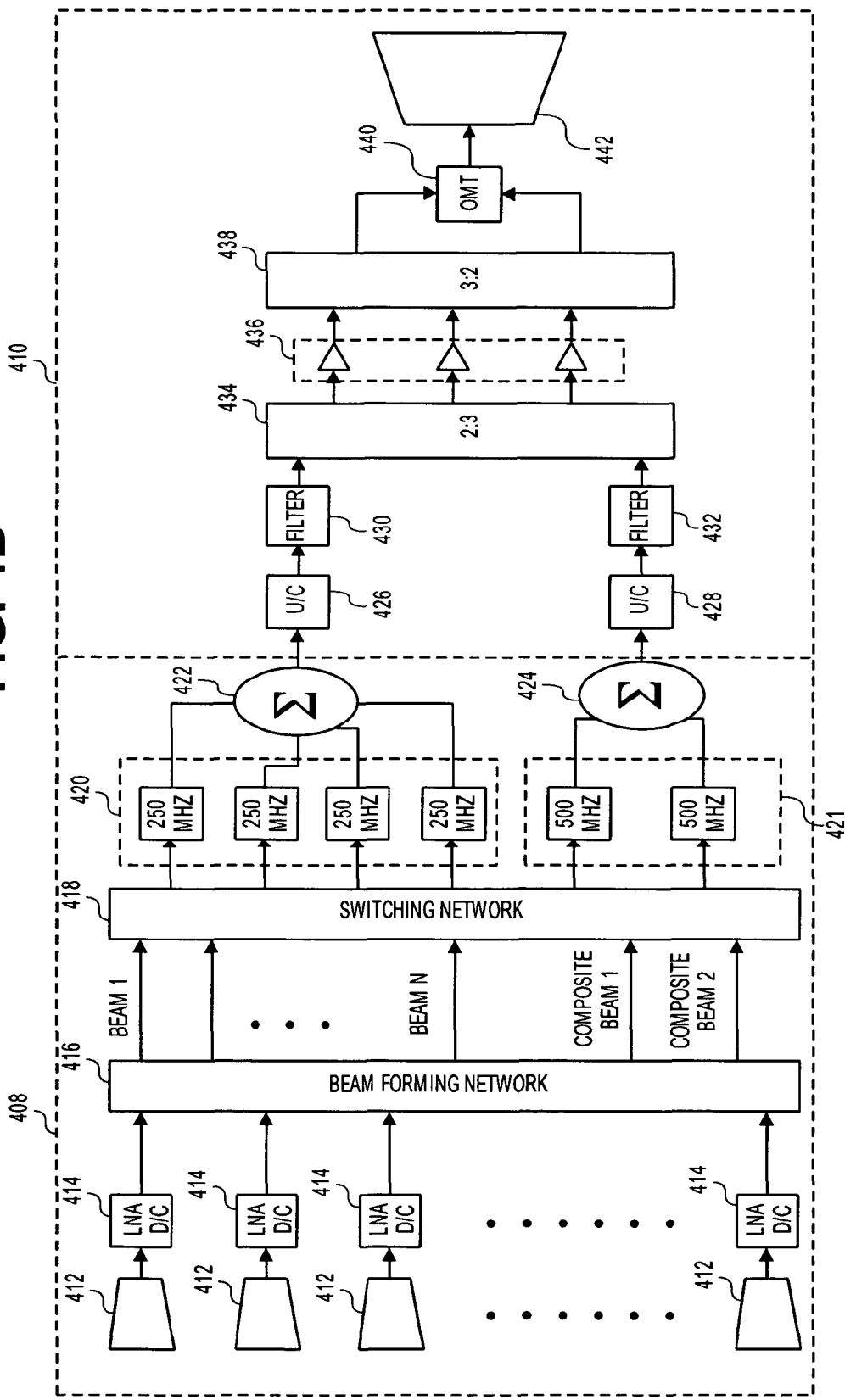

Referring to FIGS. 4A-4B, a second embodiment of a payload 400 to be mounted on the satellite 102 in the satellite communication system 100 will be discussed. The payload 400 includes a steerable spot beam antenna 402 for providing a downlink to a first user terminal, a steerable multibeam antenna 404 coupled to the steerable spot beam antenna 402 for providing an uplink from a second user terminal and a signal processing device 406 coupling the steerable spot beam antenna 402 to the steerable multibeam antenna 404. The signal processing device 406 can include a switching device 408 for reception related signal processing and a steerable spot beam antenna filtering device 410 for transmission related signal processing.

Referring to FIG. 4B, the switching device 408 can include a plurality of LNA and D/Cs 414 connected to input horns 412 of the steerable multibeam antenna 404. The LNA and D/Cs 414 are connected to a beam forming network 416 for defining a plurality of reception beams and several composite beams. For example, the beam forming network 416 can form nineteen, thirty-seven, or sixty-one reception beams and several composite beams. However, the beam forming network 416 is not limited to a particular number of reception beams and composite beams. A switching network 418 is connected to the beam forming network 416. The switching network 418 can select a subset of the plurality of reception beams or one of the composite beams as the uplink from the second user terminal. The switching network 418 is connected to a plurality of 250 MHz filters 420 and 500 MHz filters 421. The outputs of the 250 MHz filters 420 are connected to a first combiner 422 and the outputs of the 500 MHz filters 421 are connected to a second combiner 424.

The steerable spot beam antenna filtering device 410 can include an upconverter (U/C) 426 connected to the output of the first combiner 422 and an U/C 428 connected to the output of the second combiner 424. The output of the U/C 426 is connected to a filter 430 such as a 1000 MHz Left Hand Circular Polarization (LHCP) filter. The output of the U/C 428 is connected to a filter 432 such as a 1000 MHz Right Hand Circular Polarization (RHCP) filter. The outputs of the 1000 MHz LHCP filter 430 and the 1000 MHz RHCP filter 432 are connected to a 2:3 switch 434. The outputs of the 2:3 switch 434 are connected to three high power amplifiers such as, for example, 100 W Traveling Wave Tube Amplifiers (TWTA) 436. The outputs of the three 100 W TWTAs 436 are connected to a 3:2 switch 438, the outputs of which are connected to an orthomode transducer (OMT) 440 to combine the orthogonally polarized signals. The OMT 440 is connected to the output horn 442 of the steerable spot beam antenna 402.

Figure 6A:
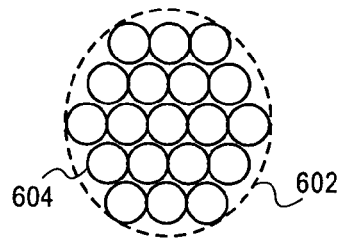
FIGS. 6A-6E are schematic illustrations of exemplary coverage achieved by the satellite communication system according to various embodiments.
Figure 6B:
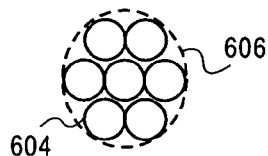

The payload control unit 120 can control the switching network 418 based upon signals received from the hub 104 via the TTC unit 117 and the decoder/encoder 118 to select a subset of the plurality of reception beams or one of the composite beams as the uplink from the second user terminal. In a first example shown in FIG. 6A, the payload control unit 120 controls the switching network 418 to select a first composite beam 602 that includes all beams of the reception beams 404 as the uplink from the user terminal (nineteen beams in this example). In a second example shown in FIG. 6B, the payload control unit 120 controls the switching network 418 to select a second composite beam 606 that includes a subset of the reception beams 604 such as, for example, seven, as the uplink from the user terminal. Further, the payload control unit 120 can control the switching network 418 to select a single reception beam 604 as the uplink.

The diameter of each of the reception beams 604 in the composite beam 602 will depend on the size of the steerable multibeam antenna. For example, if the steerable multibeam antenna 404 is a steerable 3 m Ka-band mesh or solid reflector, then the diameter of each of the reception beams 604 will be approximately 150 km. If the mesh reflector is a steerable 5 m Ka-band mesh reflector, then the diameter of each of the reception beams 404 will be approximately 85 km.

As discussed above with reference to FIG. 2, the steerable antenna control unit 122 independently steers the first servomotor 124 of the steerable multibeam antenna 404 and the second servomotor 126 of the steerable spot beam antenna 402 to independently control an orientation of the steerable spot beam antenna 402 and of the steerable multibeam antenna 404 based upon signals received from the hub 104 via the decoder/encoder 118.

Figure 4C:
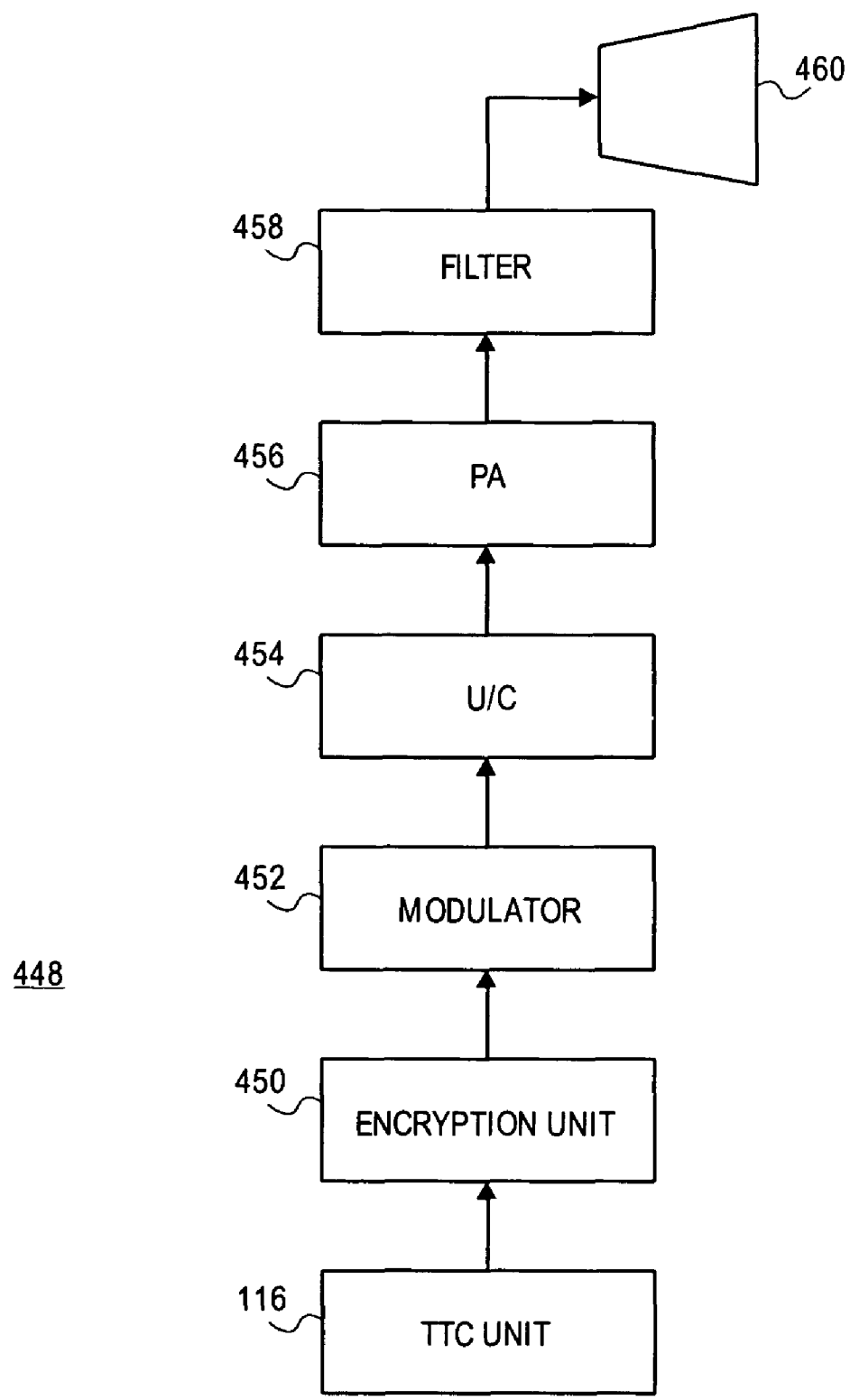

As shown in FIG. 4C, the payload 400 can further include an earth coverage antenna 448 for providing a field of coverage based upon earth coverage antenna control signals received from the hub 104. Alternatively, the earth coverage antenna could be included separately on the satellite 102. The antenna 448 includes an encryption unit 450 that is coupled to the TTC unit 117 for encrypting or decrypting signals. A modulator 452 coupled to the encryption unit 450 modulates the signal, and a U/C 454 changes the frequency of the signal modulated by the modulator 452. A power amplifier, such as a solid state power amplifier (SSPA) 456, amplifies the signal and a filter 458 filters out predetermined frequencies of the signal amplified by the SSPA 456. The filtered signal is output over an output horn 460 of the earth coverage antenna 448. As shown in FIG. 1, the earth coverage antenna 448 provides a field of coverage 110 in which the user terminals can receive a low data rate signal to be used as a beacon signal.

Referring back to FIG. 4A, the configuration of the payload 400 provides a weight/power ratio of approximately 130 kg/580 W. The steerable multibeam antenna 404 and the steerable spot beam antennas 402 can communication over uplink (reception) frequency bands of 14.0-14.5 GHz, 27.5-30 GHz, 30-31 GHz and 47.2-50.2 GHz and downlink (transmission) frequency bands of 10.7-12.75 GHz, 17.7-20.2 GHz, 20.2-21.2 GHz and 37.5-42.0 GHz. That is, the steerable multibeam antenna 404 and the steerable spot beam antenna 402 can provide an aggregate bandwidth of up to 2 GHz.

Figure 5A:
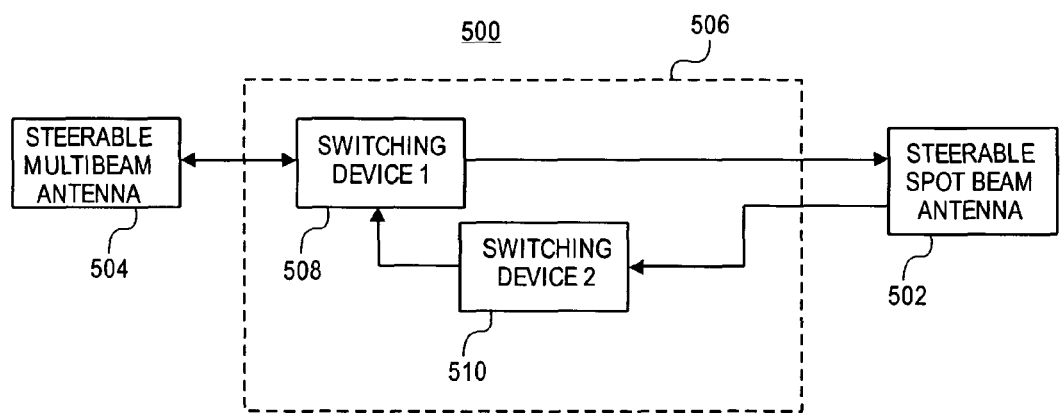
FIGS. 5A-5B are schematic block diagrams of a payload for the satellite communication system according to a third embodiment.
Figure 5B:
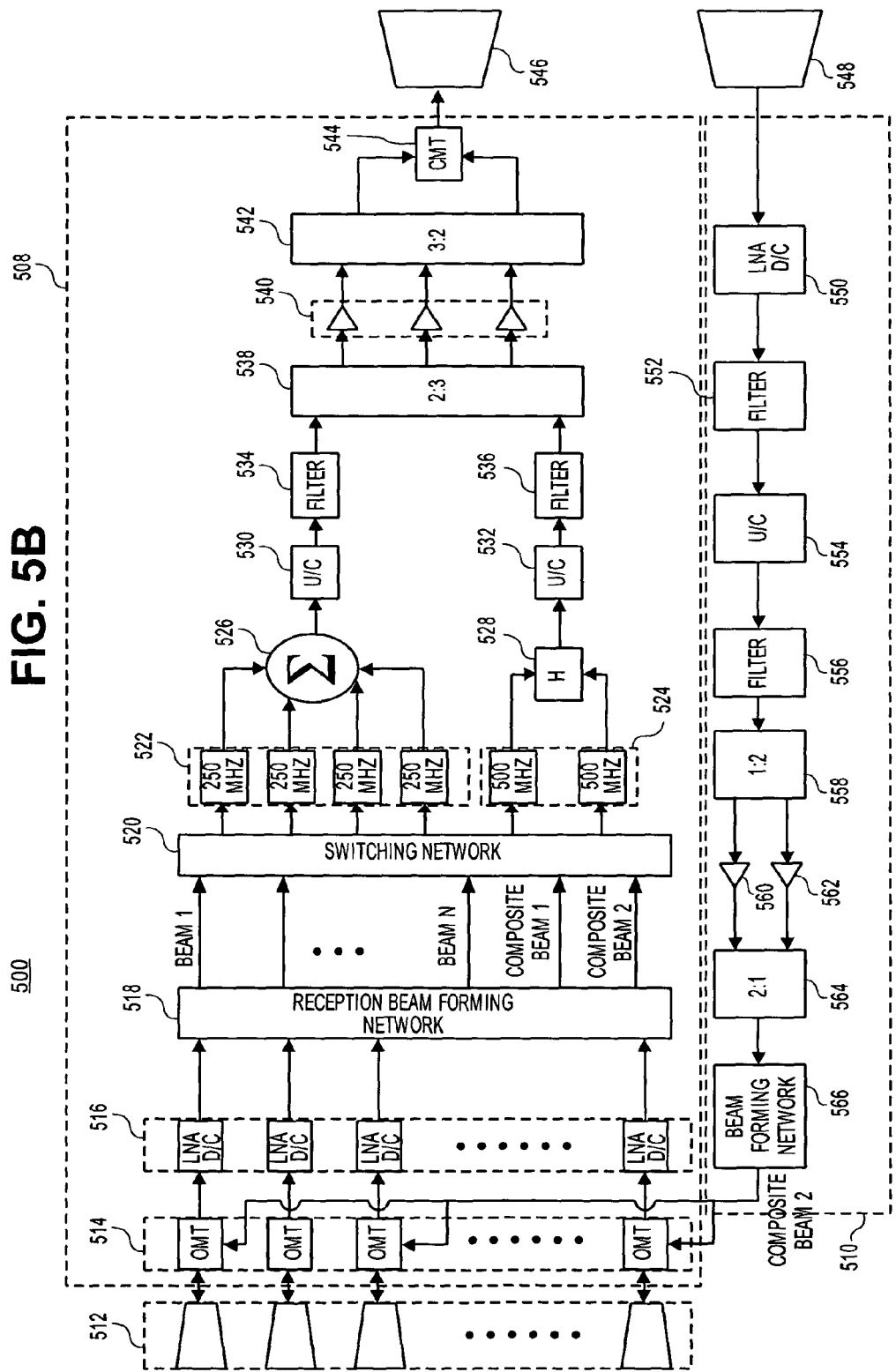

Referring to FIGS. 5A-5B, a third embodiment of a payload 500 to be mounted on the satellite 102 in the satellite communication system 100 will be discussed. The payload 500 includes a steerable spot beam antenna 502 for providing a downlink to and an uplink from a first user terminal and a steerable multibeam antenna 504 for providing a downlink to and an uplink from a second user terminal. The payload 500 further includes a signal processing device 506 for reception/transmission signal processing and for coupling the steerable multibeam antenna 504 to the steerable spot beam antenna 502. The signal processing device 506 can include a first switching device 508 and a second switching device 510.

Referring to FIG. 5B, the first switching device 508 can include a plurality of OMTs 514 respectively connected to input horns 512 of the steerable multibeam antenna 504. The outputs of the OMTs 514 are respectively connected to LNA and D/Cs 516. The outputs of the LNA/D/Cs 516 are connected to a reception beam forming network 518 for defining a plurality of reception beams and reception composite beams. In the example of FIGS. 5A-5B, the reception beam forming network 518 can form nineteen, thirty-seven or sixty-one reception beams, etc and two composite beams. However, the reception beam forming network is not limited to this number of reception beams and composite beams. A switching network 520 is connected to the beam forming network 518. The switching network 520 can select a subset of the plurality of reception beams or one of the composite beams as the uplink from the second user terminal.

The switching network 520 is connected to a plurality of 250 MHz filters 522 and 500 MHz filters 524. The outputs of the 250 MHz filters 522 are connected to a combiner 526 and the outputs of the 500 MHz filters 524 are connected to a combiner 528. The output of the combiner 526 is connected to an upconverter (U/C) 530, and the output of the U/C 530 is connected to a 1000 MHz filter 534. The output of the combiner 528 is connected to a U/C 532, and the output of the U/C 532 is connected to a 1000 MHz filter 536. The outputs of the 1000 MHz filters 534, 536 are connected to a 2:3 switch 538. The outputs of the 2:3 switch 538 are connected to three high power amplifiers such as, for example, 100 W Traveling Wave Tube Amplifiers (TWTA) 540. The outputs of the three 100 W TWTAs 540 are connected to a 3:2 switch 542, the outputs of which are connected to an OMT 544 to combine the orthogonally polarized signals. The OMT 544 is connected to an output horn 546 of the steerable spot beam antenna 502. Thereby, the uplink from the second user terminal provided by the steerable multibeam antenna 504 is linked with the downlink to the first user terminal provided by the steerable spot beam antenna 502.

The second switching device 510 can include a LNA and D/C 550 for signal amplification connected to the input horn 548 of the steerable spot beam antenna 502. The output of the LNA and D/C 550 is connected to a filter 552. The output of the filter 552 is connected to a U/C 554. The output of the U/C 554 is connected to a filter 556. The output of the filter 556 is connected to a 1:2 switch 558, the output of which is connected to two high power amplifiers such as, for example, 100 W TWTAs 560, 562. The outputs of the TWTAs 560, 562 are connected to a 2:1 switch 564. The output of the 2:1 switch 564 is connected to a transmission beam forming network 566 for defining a transmission composite beam composed of a plurality of transmission beams. The transmission beam forming network 566 can have a configuration similar to the reception beam forming network 518 to define a composite beam including a plurality of transmission beams such as, for example, nineteen, thirty-seven or sixty-one transmission beams. However, the transmission beam forming network 566 is not limited to a particular number of transmission beams. The transmission beams output from the transmission beam forming network 566 are connected to the OMTs 514, which are connected to the output horns 512 of the steerable multibeam antenna 504, to couple the transmission beams to the steerable multibeams antenna 504. Thereby, the uplink from the first user terminal provided by the steerable spot beam antenna 502 is linked with the downlink to the second user terminal provided by the steerable multibeam antenna 504.

The payload control unit 120 can control the switching network 520 based upon signals received from the hub 104 via the TTC unit 117 and the decoder/encoder 118 to select a subset of the plurality of reception beams or one of the composite beams as the uplink from the second user terminal. Further, the payload control unit 120 can control the beam forming network 566 to form the downlink with the second user terminal as a transmission composite beam that includes one or more of the transmission beams. Further, the payload 500 can also include the earth coverage antenna 448 shown in FIG. 4C for providing a field of coverage based upon earth coverage antenna control signals received from the hub 104.

Figure 6C:
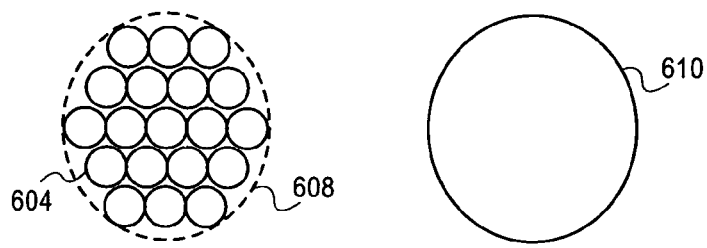

In a first example shown in FIG. 6C, the payload control unit 120 controls the switching network 520 of the first switching device 508 to select a first composite beam 608 that includes all nineteen of the reception beams 604 as the uplink from the second user terminal provided by the steerable multibeam antenna 504. The uplink is linked with a spot beam 610 as the downlink to the first user terminal provided by the steerable spot beam antenna 502 to provide a communication link between the first user terminal and the second user terminal.

Figure 6D:
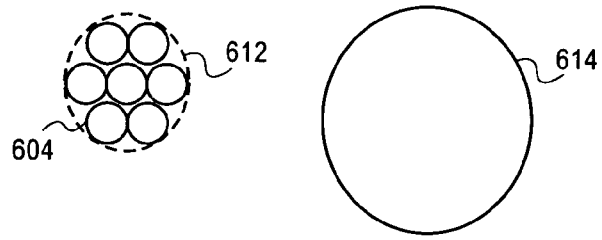

In a second example shown in FIG. 6D, the payload control unit 120 controls the switching network 520 to select a second composite beam 612 that includes a subset, such as, for example, seven, of the reception beams 604 as the uplink from the second user terminal provided by the multibeam antenna 504. The uplink is linked with a spot beam 614 as the downlink to the first user terminal provided by the steerable spot beam antenna 502 to provide a communication link between the first user terminal and the second user terminal.

Figure 6E:
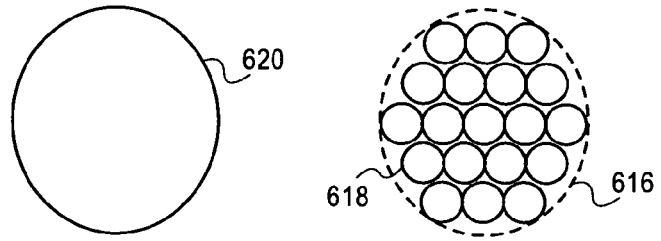

In a third example shown in FIG. 6E, the payload control unit 120 controls the beam forming network 566 of the second switching device 510 to select a transmission composite beam 616 that includes nineteen of the transmission beams 618 as the downlink to the second user terminal provided by the multibeam antenna 504. The downlink is linked with a spot beam 620 as the uplink from the first user terminal provided by the steerable spot beam antenna 502 to provide a communication link between the first user terminal and the second user terminal.

As discussed above with reference to FIG. 2, the steerable antenna control unit 122 independently steers the first servomotor 124 of the steerable multibeam antenna 504 and the second servomotor 126 of the steerable spot beam antenna 502 to independently control an orientation of the steerable spot beam antenna 502 and of the steerable multibeam antenna 504 based upon signals received from the hub 104 via the decoder/encoder 118.

The configuration of the payload 500 provides a weight/power ratio of approximately 147 kg/810 W. The steerable multibeam antenna 504 and the steerable spot beam antennas 502 can communication with user terminals over uplink (reception) frequency bands of 14.0-14.5 GHz, 27.5-30 GHz, 30-31 GHz and 47.2-50.2 GHz and downlink (transmission) frequency bands of 10.7-12.75 GHz, 17.7-20.2 GHz, 20.2-21.2 GHz and 37.5-42.0 GHz. That is, the steerable multibeam antenna 504 and the steerable spot beam antenna 502 can provide an aggregate bandwidth of greater than 2 GHz.

The payload of the novel embodiments can provide the downlinks and uplinks in a bandwidth adjustable between 125, 250, 500 and 1000 MHz. The payload can provide uplinks from user terminals in a military band of approximately 30-31 GHz terminals and in commercial bands of 14.0-14.5 GHz, 27.5-30 GHz and 47.2-50.2 GHz. The payload can provide downlinks to user terminals in a military band of approximately 20.2-21.2 GHz and in commercial bands of approximately 10.7-12.75 GHz, 17.7-20.2 GHz and 37.5-42 GHz. Therefore, a commercially oriented satellite can be augmented to meet the needed wide-band military capacity.

The satellite receive gain and noise temperature ratio (G/T) of the payloads 300, 400, 500 is in a range from 14 dB/K to 33 dB/K depending on configurations, which are significantly higher than the Ku-band satellite receive G/T of typically approximately 4 dB/K. Further, depending on the configuration, the payloads 300, 400, 500 can achieve an uplink data rate in a range from 75 Mbps to 1050 Mbps. These data rates are significantly higher than the data rate of the existing Ku-band satellites, which can only achieve uplink data rates of 20 Mbps.

The apparatuses and methods discussed above and the inventive principles thereof are intended to and will augment commercial satellites in order to meet needed wide-band military capacity. It is expected that one of ordinary skill given the above described principles, concepts and examples will be able to implement other alternative procedures and constructions that offer the same benefits. It is anticipated that the claims below cover many such other examples.

The invention claimed is:

1. A payload for mounting onto a host spacecraft, comprising:
   a first steerable spot beam antenna providing a downlink to and an uplink from a first user terminal;
   a second steerable spot beam antenna providing a downlink to and an uplink from a second user terminal;
   a switching network coupling the first steerable spot beam antenna to the second steerable spot beam antenna; and
   a payload control unit controlling the switching network to select one of the downlink to the first user terminal provided by the first steerable spot beam antenna and the downlink to the second user terminal provided by the second steerable spot beam antenna and one of the uplink from the first user terminal provided by the first steerable spot beam antenna and the uplink from the second user terminal provided by the second steerable spot beam antenna, wherein
   the first steerable spot beam antenna and the second steerable spot beam antenna provide the downlinks to and uplinks from the first and second user terminals in a bandwidth adjustable between 125 MHz, 250 MHz, 500 MHz and 1000 MHz, and
   the first steerable spot beam antenna and the second steerable spot beam antenna provide the uplinks from the first and second user terminals at a frequency ranges of approximately 14.0-14.5 GHz, 27.5-30 GHz, 30-31 GHz and 47.2-50.2 GHz and provide the downlinks to the first and second user terminals at frequency ranges of approximately 10.7-12.75 GHz, 17.7-20.2 GHz 20.2-21.2 GHz and 37.5-42.0 GHz.

2. The payload of claim 1, further comprising
a decoder/encoder decoding encrypted signals received from a hub and transmitting the decoded signals to the payload control unit, and encoding encrypted signals received from the payload control unit and transmitting the encoded signals to the hub.

3. The payload of claim 2, wherein
the decoder/encoder is coupled to a telemetry tracking and control (TTC) unit to provide a signal connection between the host spacecraft and the payload control unit.

4. The payload of claim 1, wherein
the first steerable spot beam antenna and the second steerable spot beam antenna provide the downlinks to and uplinks from the first and second user terminals in a commercial band and military frequency band of 10 GHz-100 GHz.

5. The payload of claim 4, wherein
the host spacecraft is a commercial satellite.

6. The payload of claim 1, further comprising
a steerable antenna control unit independently steering the first steerable spot beam antenna and the second steerable spot beam antenna.

7. A payload for mounting onto a host spacecraft, comprising:
   a steerable spot beam antenna providing a downlink to a first user terminal;
   a steerable multibeam antenna providing an uplink from a second user terminal, the steerable multibeam antenna coupled to the steerable spot beam antenna, and
   a switching device including a beam forming network defining a plurality of reception beams and composite beams, and further including a switching network selecting either a subset of the plurality of reception beams or one of the composite beams as the uplink from the second user terminal.

8. The payload of claim 7, further comprising
a payload control unit coupled to the switching network, the payload control unit controlling the switching network based upon received control signals.

9. The payload of claim 7, further comprising
a steerable antenna control unit for independently controlling an orientation of the steerable spot beam antenna and of the steerable multibeam antenna.

10. The payload of claim 7, wherein
the steerable multibeam antenna comprises one of a mesh reflector and a solid reflector, wherein the steerable multibeam antenna is operable in one of the Ku-band, Ka-band and V-band.

11. The payload of claim 7, further comprising
an earth coverage antenna for providing a field of coverage based upon received earth coverage antenna control signals.

12. A payload for mounting onto a host spacecraft, comprising:
a steerable spot beam antenna providing a downlink to and an uplink from a first user terminal;
a steerable multibeam antenna providing a downlink to and an uplink from a second user terminal; and
a signal processing device that couples the steerable spot beam antenna and the steerable multibeam antenna, the signal processing device including a beam forming network for defining a plurality of reception beams and reception composite beams, and further including a switching network selecting either a subset of the plurality of reception beams or one of the composite beams as the uplink from the second user terminal, wherein
the steerable multibeam antenna is coupled to the steerable spot beam antenna to link the downlink to the first user terminal provided by the steerable spot beam antenna with the uplink from the second user terminal provided by the steerable multibeam antenna, and to link the uplink from the first user terminal provided by the steerable spot beam antenna with the downlink to the second user terminal provided by the steerable multibeam antenna.

13. The payload of claim 12, wherein
the signal processing device further includes another beam forming network defining a plurality of transmission beams, the plurality of transmission beams being coupled to the steerable multibeam antenna to provide the downlink to the second user terminal as a transmission composite beam comprising the plurality of transmission beams.

14. The payload of claim 13, further comprising:
a payload control unit controlling the switching network and the another switching network based upon received control signals.

15. The payload of claim 12, wherein
the downlink with the second user terminal is a transmission composite beam.

16. The payload of claim 12, further comprising:
a payload control unit controlling the switching network based upon received control signals.

17. The payload of claim 16, further comprising
a decoder/encoder decoding encrypted signals received from a hub and transmitting the decoded signals to the payload control unit, and encoding encrypted signals received from the payload control unit and transmitting the encoded signals to the hub, wherein
the decoder/encoder is coupled to a telemetry tracking and control (TTC) unit for providing a signal connection between the host spacecraft and the payload control unit via the TTC unit.

18. The payload of claim 12, further comprising
a steerable antenna control unit for controlling an orientation of the steerable spot beam antenna and the steerable multibeam antenna independently based upon received signals.

\* \* \* \* \*